United States Patent
Liu et al.

(10) Patent No.: US 9,214,165 B1
(45) Date of Patent: Dec. 15, 2015

(54) MAGNETIC WRITER HAVING A GRADIENT IN SATURATION MAGNETIZATION OF THE SHIELDS

(71) Applicant: Western Digital (Fremont), LLC, Fremont, CA (US)

(72) Inventors: Feng Liu, San Ramon, CA (US); Zhanjie Li, Pleasanton, CA (US); Zhigang Bai, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/575,090

(22) Filed: Dec. 18, 2014

(51) Int. Cl.
*G11B 5/11* (2006.01)
*G11B 5/60* (2006.01)

(52) U.S. Cl.
CPC ............... *G11B 5/11* (2013.01); *G11B 5/6082* (2013.01)

(58) Field of Classification Search
CPC .... G11B 5/1278; G11B 5/315; G11B 5/3116; G11B 5/3163; G11B 5/0083; G11B 5/115; G11B 5/105; G11B 5/127
USPC ........................................................ 360/125.3
See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,160,684 A | 12/2000 | Heist et al. | |
| 6,163,426 A | 12/2000 | Nepela et al. | |
| 6,166,891 A | 12/2000 | Lederman et al. | |
| 6,173,486 B1 | 1/2001 | Hsiao et al. | |
| 6,175,476 B1 | 1/2001 | Huai et al. | |

(Continued)

*Primary Examiner* — Mark Blouin

(57) ABSTRACT

A method and system provide a magnetic transducer. The transducer includes a main pole, a side gap, at least one coil and at least one of a leading shield, a trailing shield and side shield(s). A portion of the main pole resides at the ABS. The coil(s) are configured to energize the main pole. The side gap is being between the main pole and the at least one side shield. At least one of the leading shield, the side shield(s) and the trailing shield has a gradient in a saturation magnetization ($B_s$) such that the saturation magnetization increases in a yoke direction perpendicular to the ABS.

24 Claims, 14 Drawing Sheets

(56) References Cited

U.S. PATENT DOCUMENTS

| | | |
|---|---|---|
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |

(56) References Cited

U.S. PATENT DOCUMENTS

| | | |
|---|---|---|
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |

(56) References Cited

U.S. PATENT DOCUMENTS

| | | | |
|---|---|---|---|
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,470,186 B2 | 6/2013 | Chen et al. |
| 8,472,136 B2 * | 6/2013 | Batra et al. ............... 360/119.04 |

(56) References Cited

U.S. PATENT DOCUMENTS

| | | |
|---|---|---|
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,079 B1 * | 7/2013 | Song et al. ............... 360/125.3 |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,830,626 B2 * | 9/2014 | Heim et al. ............... 360/125.3 |
| 8,842,390 B2 * | 9/2014 | Shen et al. ............... 360/125.3 |
| 2008/0273276 A1 | 11/2008 | Guan |
| 2010/0290157 A1 | 11/2010 | Zhang et al. |
| 2010/0321835 A1 | 12/2010 | Zhang et al. |
| 2011/0086240 A1 | 4/2011 | Xiang et al. |
| 2011/0097601 A1 | 4/2011 | Bai et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0063657 A1 | 3/2014 | Gao et al. |
| 2014/0154529 A1 | 6/2014 | Yang et al. |
| 2014/0175050 A1 | 6/2014 | Zhang et al. |

* cited by examiner

MAGNETIC WRITER HAVING A GRADIENT IN SATURATION MAGNETIZATION OF THE SHIELDS

BACKGROUND

FIGS. 1A and 1B air-bearing surface (ABS) and plan views, respectively, of a conventional magnetic recording transducer 10. The magnetic recording transducer 10 may be a perpendicular magnetic recording (PMR) head. The conventional transducer 10 includes an underlayer 12 that may include a leading shield, side gap 14, side shields 16, top gap 17, a top (or trailing) shield 18 and main pole 20.

The main pole 20 resides on an underlayer 12 and includes sidewalls 22 and 24. The sidewalls 22 and 24 of the conventional main pole 20 form an angle with the down track direction at the ABS. The side shields 16 are separated from the main pole 20 by a side gap 14. The side shields 16 extend at least from the top of the main pole 20 to the bottom of the main pole 20. The side shields 16 also extend a distance back from the ABS. The gap 14 between the side shields 16 and the main pole 20 may have a substantially constant thickness. Thus, the side shields 16 are conformal with the main pole 20.

Although the conventional magnetic recording head 10 functions, there are drawbacks. In particular, the conventional magnetic recording head 10 may not perform sufficiently at higher recording densities or for some recording schemes. Accordingly, what is needed is a system and method for improving the performance of a magnetic recording head.

DETAILED DESCRIPTION OF THE PREFERRED EMBODIMENTS

Figure 1A:
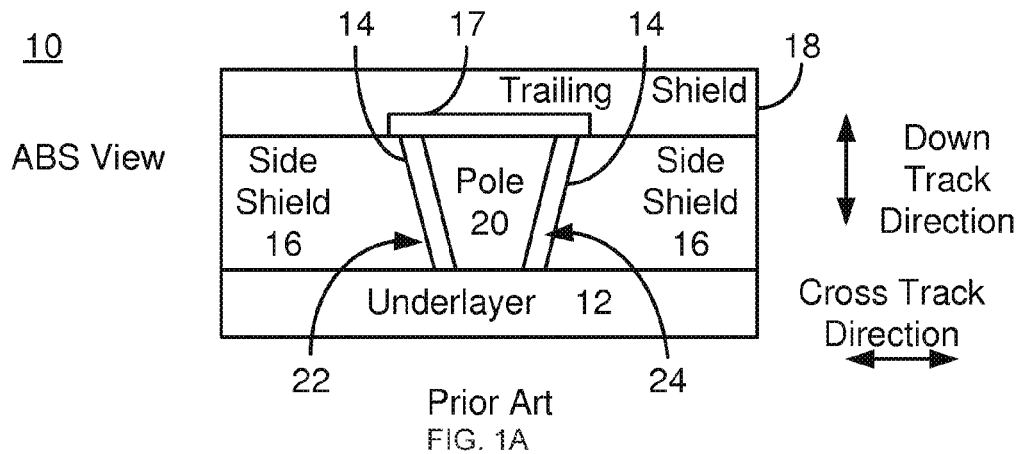
FIGS. 1A-1B depict ABS and plan views of a conventional magnetic recording head.
Figure 1B:
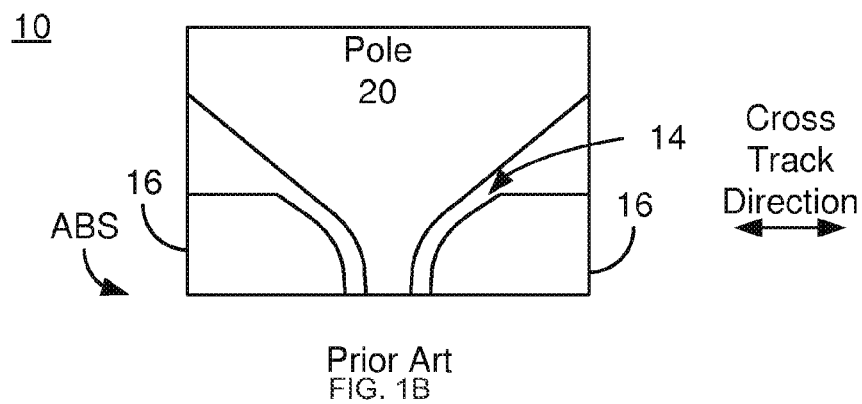

The trend in magnetic recording is to higher densities. For such higher recording densities, a full wrap around shield may be used. For example, the trailing shield 18, side shields 16 and a leading shield in the underlayer 12 may be used in the transducer 10 depicted in FIGS. 1A-1B. The trailing shield 18 may have a high saturation magnetization of approximately 2.3 T. The high saturation magnetization may be desired to provide the desired field gradient. The leading shield of the underlayer 12 may have a low saturation magnetization on the order of 1 T. The low saturation magnetization of the leading shield may aid in balancing on and off track performance. The side shield 16 has a higher saturation magnetization of approximately 2 T.

In some cases, different writing schemes are used to facilitate higher density recording. For example, a shingle recording scheme may be desired to be used at higher areal densities. In shingle recording, successive tracks partially overwrite previously written tracks in one direction only. Part of the overwritten tracks, such as their edges, are preserved as the recorded data. In shingle recording, a higher side shield saturation magnetization may be desired.

It has been determined that there may be issues in high density recording for the configurations and writing schemes described above. For the full wraparound shield described above, a mismatch between the saturation magnetizations of the side shield 16 and the trailing shield 18 may result in flux leakage at the interface between the side shield 16 and the trailing shield 18. This flux leakage may result in wide area track erasure (WATER) issues. For shingle recording, the higher saturation magnetization side shield may shunt flux from the main pole 20. Writing may thus be degraded. In addition, switching of the main pole 20 is a dynamic process. This switching may perturb the domain structure of the side shields 16 and result in magnetic poles in the side shields 16 at the ABS and motions of domain walls with in the side shield 16. These also result in WATER issues. Consequently, it has been determined that there are unaddressed issues in recording at higher areal densities.

Figure 2A:
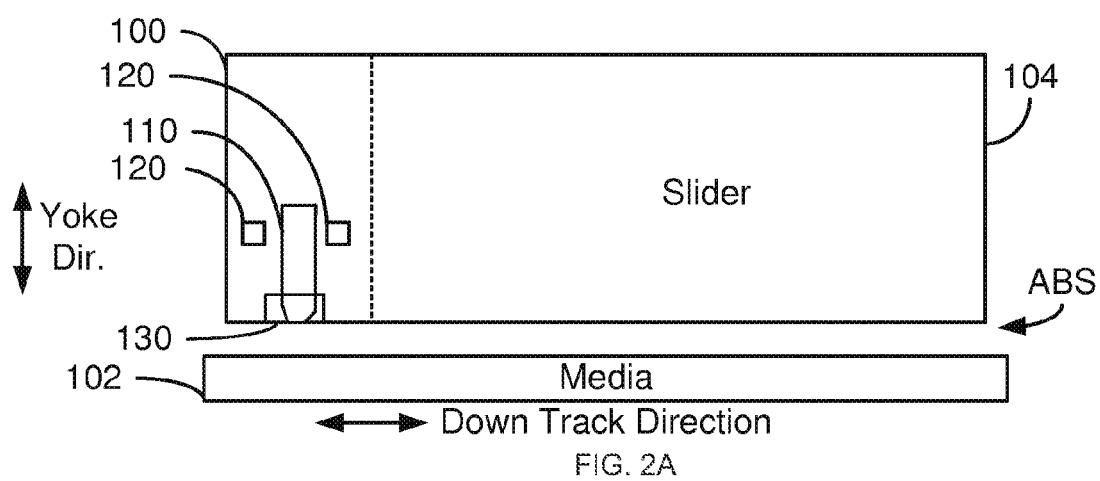
FIGS. 2A, 2B, 2C and 2D depict side, ABS, plan and close-up side views of portions of an exemplary embodiment of a magnetic recording disk drive with side shields having a gradient in saturation magnetization.
Figure 2B:
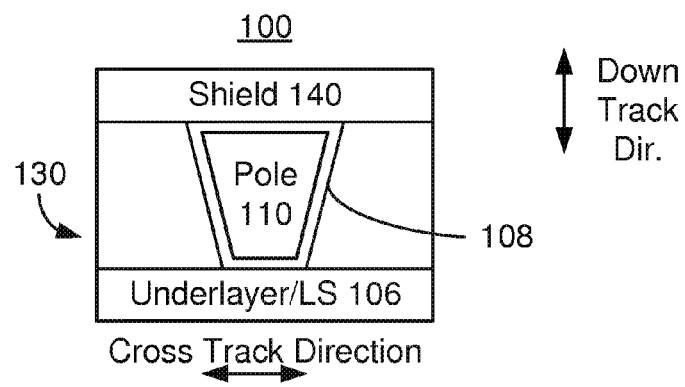
Figure 2C:
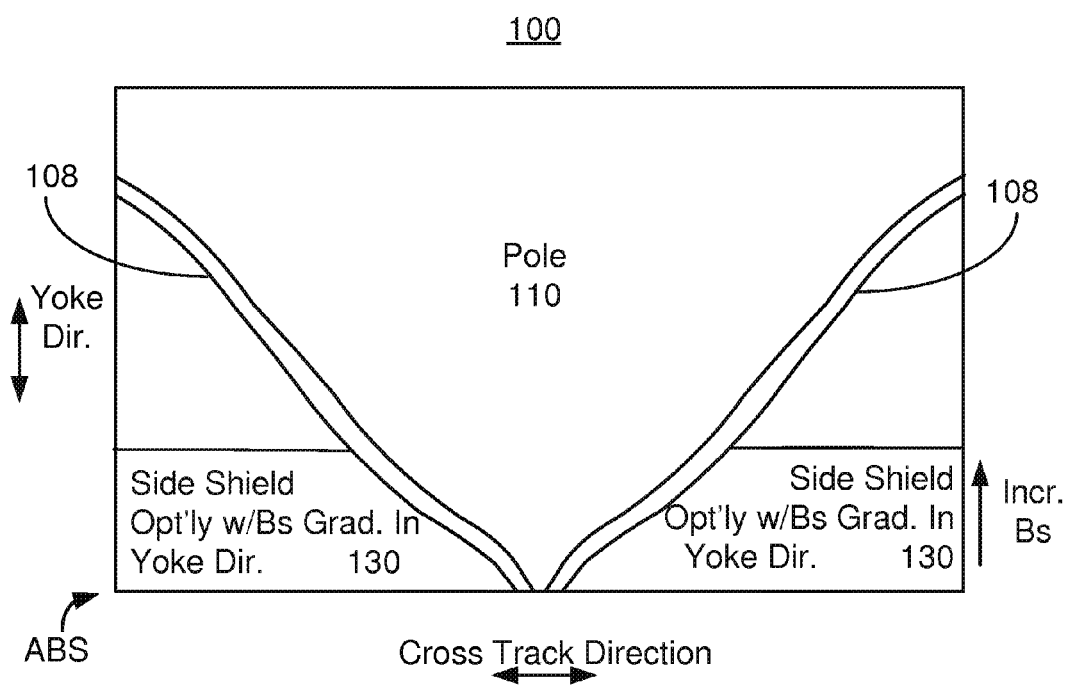
Figure 2D:
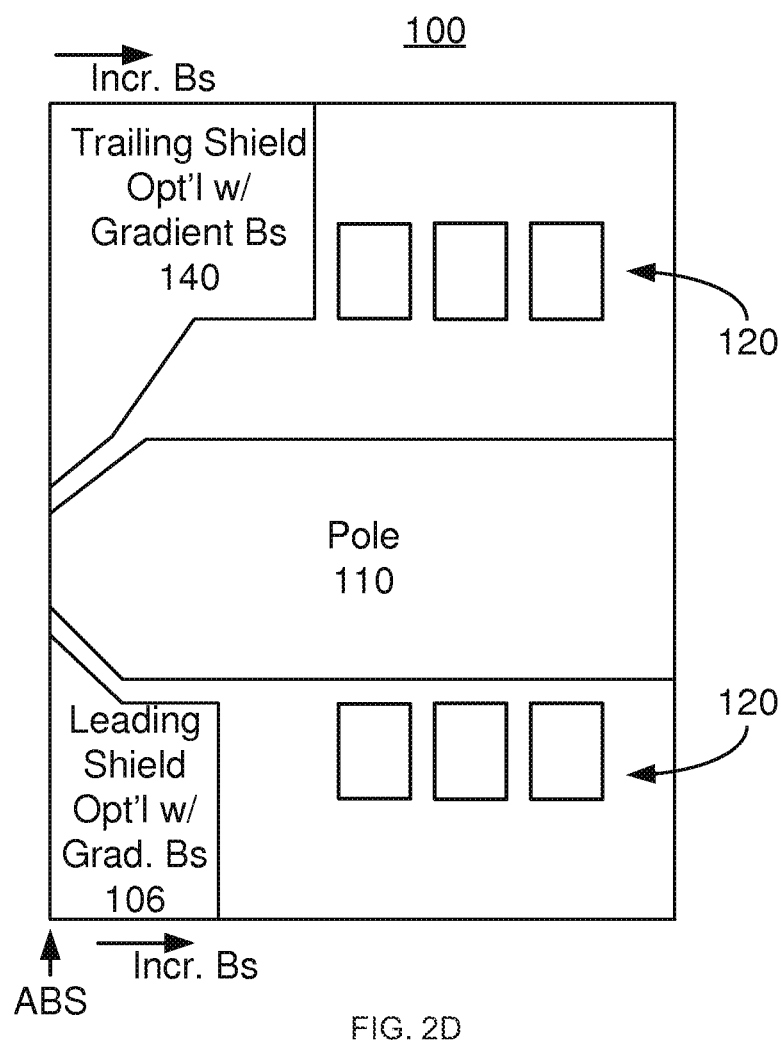

FIGS. 2A, 2B, 2C and 2D depict various views of an exemplary embodiment of a data storage device, such as a disk drive. FIG. 2A depicts a side view of the disk drive including a magnetic write apparatus 100 that is termed a magnetic transducer. FIGS. 2B, 2C and 2D depict ABS, plan and side views of the magnetic recording apparatus, or transducer 100. For clarity, FIGS. 2A-2D are not to scale. For simplicity not all portions of the disk drive and transducer 100 are shown. In addition, although the disk drive and transducer 100 are depicted in the context of particular components other and/or different components may be used. For example, circuitry used to drive and control various portions of the disk drive is not shown. For simplicity, only single components are shown. However, multiples of each components and/or their sub-components, might be used. The disk drive may be a perpendicular magnetic recording (PMR) disk drive. However, in other embodiments, the disk drive may be configured for other types of magnetic recording included but not limited to heat assisted magnetic recording (HAMR).

The disk drive includes a media 102 and a slider 104 on which the transducer 100 has been fabricated. Although not shown, the slider 104 and thus the transducer 100 are generally attached to a suspension. In general, the slider 104 includes the write transducer 100 and a read transducer (not shown). However, for clarity, only the write transducer 100 is shown.

The transducer 100 includes an underlayer 106, a gap 108, a main pole 110, coil(s) 120, side shields 130 and optional trailing shield 140. The underlayer 106 may include a bottom (or leading) shield. The coil(s) 120 are used to energize the main pole 110. Two turns are depicted in FIG. 2A. Another number of turns may, however, be used. Note that only a portion of the coil(s) 120 may be shown in FIG. 2A. If, for example, the coil(s) 120 is a spiral, or pancake, coil, then additional portions of the coil(s) 120 may be located further from the ABS. Further, additional coils may also be used.

The main pole 110 is shown as having a top wider than the bottom. The main pole 110 thus includes sidewalls having sidewall angles that are greater than or equal to zero. In an embodiment, these sidewall angles differ at different distances from the ABS. In other embodiments, other geometries may be used. For example, the top may be the same size as or smaller than the bottom. The sidewall angles may vary in another manner. The main pole 110 is depicted as having a trapezoidal shape including a flat bottom. In other embodiment, the main pole 110 may have another shape. In some embodiments, the main pole 110 may have leading surface bevel and/or a trailing surface bevel. Thus, the main pole 110 may be shorter in the down track direction at the ABS than at location(s) recessed from the ABS.

The gap layer 108 may include one or more sublayers as well as a seed layer. Further, although depicted as a single gap surrounding the main pole 110, the gap 108 may include separate side gaps (between the mail pole 110 and side shields 130) and write gap (between the main pole 110 and trailing shield 140). In addition, although depicted as symmetric, the gap 108 may be asymmetric. For example, the gap between a side of the main pole 110 and one side shield may be wider than the gap between the opposite side of the main pole 110 and the other side shield.

The transducer 100 also includes side shields 130. The side shields 130 may be magnetically and, in some embodiments, physically connected with the trailing shield 140 and leading shield of the underlayer 106. In such embodiments, a full wraparound shield is formed. In other embodiments, the side shields 130 may be physically and/or magnetically disconnected from the trailing shield 140 and/or the leading shield of the underlayer 106. The side shields 130 are also depicted as symmetric in the cross track direction. In other embodiments, asymmetries in the cross track direction may be present.

As can be seen in FIGS. 2B, 2C and 2D, at least one of the side shields 130, the leading shield 106 and the trailing shield 140 has a gradient in saturation magnetization ($B_s$) such that the saturation magnetization increases in a yoke direction perpendicular to the ABS. In some embodiments, the saturation magnetization increase monotonically with distance from the ABS. In other words, the $B_s$ increases, without any decreases, with distance from the ABS. This increase may be linear, step-wise, or described in another manner. In other embodiments, the increase in saturation magnetization need not be monotonic and/or need not be described by a well-known function. Thus, in some embodiments, the saturation magnetization of portions of the side shields 130 recessed from the ABS is greater than the saturation magnetization of portions of the side shields 130 at the ABS. In some embodiments, the saturation magnetization of portions of the leading shield 106 recessed from the ABS is greater than the saturation magnetization of portions of the leading shield 106 at the ABS. Similarly, in some embodiments, the saturation magnetization of portions of the trailing shield 140 recessed from the ABS is greater than the saturation magnetization of portions of the trailing shield 140 at the ABS. Thus, one, two or all of the shields 106, 130 and 140 have a saturation magnetization that increases with increasing distance from the ABS.

The gradient in saturation magnetization may be achieved in a number of ways. In some embodiments, the concentration of various constituents in the alloy(s) of the side shields 130, leading shield 106 and/or trailing shield 140 may be varied such that $B_s$ increases with increases distance from the ABS in the yoke direction. In other embodiments, regions of different saturation magnetizations may be provided. For example, a layer closest to and including the ABS may be an alloy having one saturation magnetization. The next layer in the yoke direction may be another alloy having a higher $B_s$, and so on. For example, in some embodiments, the saturation magnetization of the side shields 130 at the ABS may be at least 1 T and not more than 2 T. In some such embodiments, the $B_s$ is not more than 1.6 T. In other embodiments, $B_s$ at the ABS is at least 1 T and not more than 1.2 T. Further from the ABS, the saturation magnetization is greater. For example, $B_s$ may be greater than 2 T some distance from the ABS. In some embodiments, $B_s$ is at least 2.3 T at the back surface of the side shields 130 furthest from the ABS. The leading shield 106 and trailing shield 140 may be similarly configured. In other embodiments, the variations in the saturation magnetization of the leading shield 106 and/or trailing shield 140 may differ from that of the side shields 130. In some embodiments, the saturation magnetizations of the shields 106, 130 and 140 may match throughout the shields. In other cases, the saturation magnetizations of the shields 106, 130 and 140 may be different in all locations. In still other embodiments, the saturation magnetizations of the shields 106, 130 and 140 may be the same in some locations, but different in other locations. For example, the trailing shield 140 may have a saturation magnetization of at least 2 T at the ABS and at least 2.3 T some distance from the ABS. The side shields 130 might have a saturation magnetization of 1-1.2 T at the ABS and 2.3 T further from the ABS. The interfaces between the regions of different saturation magnetization may be at some angle less than ninety degrees from the ABS. In some such embodiments, the layers having different saturation magnetizations have interfaces that are parallel to the ABS. In some embodiments, the saturation magnetization is constant in planes parallel to the ABS. For example, the $B_s$ does not vary in the down track and/or cross track directions for a plane parallel to the ABS. In other embodiments, $B_s$ may vary along the down track and/or cross track direction.

Performance of the transducer 100 and disk drive may be improved by the side shields 130 having a gradient in the saturation magnetization. Because portion(s) of the side shields 130 closest to the ABS has a lower magnetic moment, flux shunting may be reduced. However, portion(s) the side shields 130 further from the ABS have a higher saturation magnetization. Similar benefits might be achieved by configuring the leading shield 106 and/or the trailing shield 140 with a gradient in saturation magnetization such that the saturation magnetization increases in the yoke direction. Consequently, the gradient in the field from the pole may be improved. This increase may be particularly relevant for shingle recording. The increased saturation magnetization of portion(s) of the side shields 130 recessed from the main pole 110 may be less affected by the dynamic nature of switching of the main pole 110. The reduced saturation magnetization of the shields 106, 130 and/or 140 allows the shields 106, 130 and/or 140, respectively, to be less affected the return field from the media 102. These feature may help address WATER and other issues. Thus, performance of the transducer 100 may be improved.

Figure 3:
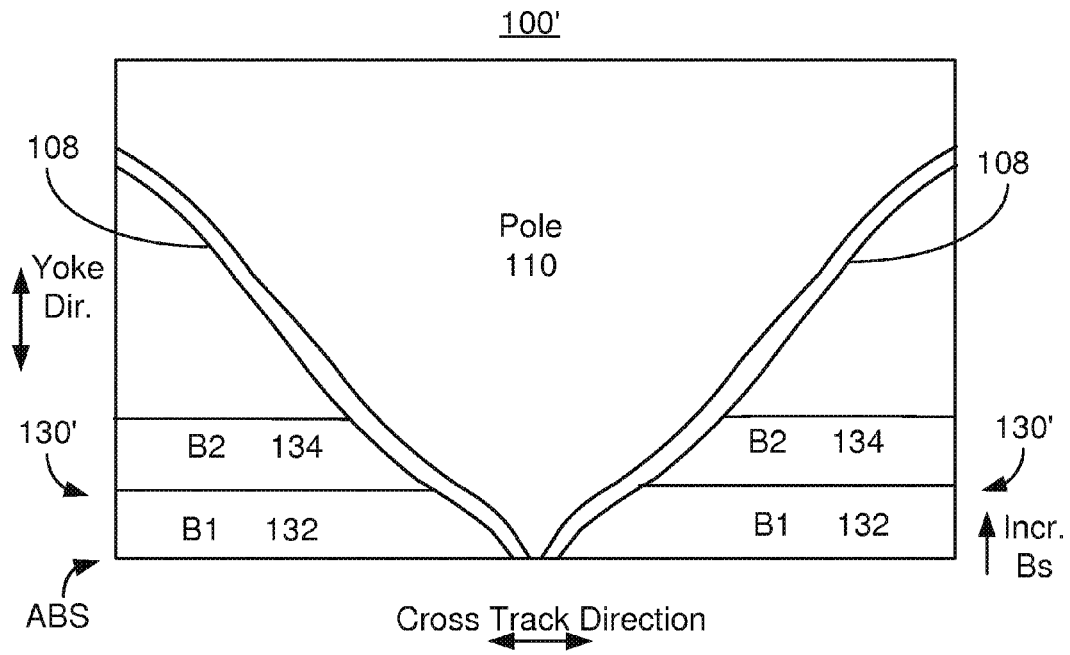
FIG. 3 is a plan view of another exemplary embodiment of a portion of a magnetic recording transducer with side shields having a gradient in saturation magnetization.

FIG. 3 depicts a plan view of another exemplary embodiment of the magnetic recording apparatus, or transducer 100'. For clarity, FIG. 3 is not to scale. For simplicity not all portions of the transducer 100' are shown. In addition, although the transducer 100' is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100' is analogous to the transducer 100, similar components have similar labels. Thus, the transducer 100' includes a side gap 108, main pole 110 and side shields 130' that are analogous to the side gap 108, the main pole 110 and the side shields 130, respectively.

The side shields 130' may be magnetically and, in some embodiments, physically connected with the trailing shield (not shown in FIG. 3) and leading shield (not shown in FIG. 3) of the underlayer (not shown in FIG. 3). In such embodiments, a full wraparound shield is formed. In other embodiments, the side shields 130' may be physically and/or magnetically disconnected from the trailing shield and/or the leading shield of the underlayer. The side shields 130' and side gap 108 are also depicted as symmetric in the cross track direction. In other embodiments, asymmetries in the cross track direction may be present.

The side shields 130' have a gradient in $B_s$ in the yoke direction. In the embodiment shown, this is achieved by including regions 132 and 134 in the side shields 130'. The first side shield region 132 occupies a portion of the ABS and is between the ABS and the second side shield region 134. In some embodiments, the saturation magnetization, B1, of the first region 132 at the ABS may be at least 1 T and not more than 2 T. In some such embodiments, the B1 for the region 132 is not more than 1.6 T. In other embodiments, B1 is at least 1 T and not more than 1.2 T. In the embodiment shown, the saturation magnetization for the region 132 is constant throughout the region. However, in other embodiments, the saturation magnetization may vary within the region 132. The region 132 may have a thickness in the yoke direction of at least twenty nanometers and not more than fifty nanometers. In some embodiments, the thickness of the region 132 in the yoke direction is at least twenty-five nanometers. In other embodiments, other thicknesses are possible. The thickness of the region 132 in the yoke direction may be sufficiently large that the region 132 is present after fabrication of the transducer, including lapping. Thus, as deposited, the region 132 is thicker than the tolerances for fabrication of the transducer 100. In some such embodiments, the region 132 is desired to be sufficiently thick that at least one domain wall may be accommodated. Thus, the region 132 is thicker than a domain wall plus the fabrication tolerances. However, other thicknesses may be possible.

The saturation magnetization (B2) of the second region 134 is larger than the saturation magnetization of the first region 132. In other words B2>B1. For example, B2 may be greater than 2 T. In some embodiments, B2 is at least 2.3 T at the back surface of the side shields 130 furthest from the ABS. The interfaces between the regions 132 and 134 may be at some angle less than ninety degrees from the ABS. In the embodiment shown, theses interfaces are substantially parallel to the ABS. In some embodiments, B2 does not vary in the region 134. In other embodiments, B2 may vary within the region 134. The thickness of the region 134 may be at least fifty nanometers and not more than eighty nanometers. In other embodiments, other thicknesses are possible.

Performance of the transducer 100' and disk drive may be improved by the side shields 130'. Because the region 132 closest to the ABS has a lower saturation magnetization than the region 134, flux shunting may be reduced. However, the region 134 of the side shields 130' has a higher saturation magnetization. Consequently, the gradient in the field from the pole may be improved. This increase may be particularly relevant for shingle recording. The increased saturation magnetization of portion(s) of the side shields recessed from the ABS may be less affected by the dynamic nature of switching of the main pole. In addition, the reduced saturation magnetization of the region 132 at the ABS allow the shield 130 to be less affected the return field from the media. These features may help address WATER and other issues. Thus, performance of the transducer 100' may be improved.

Figure 4:
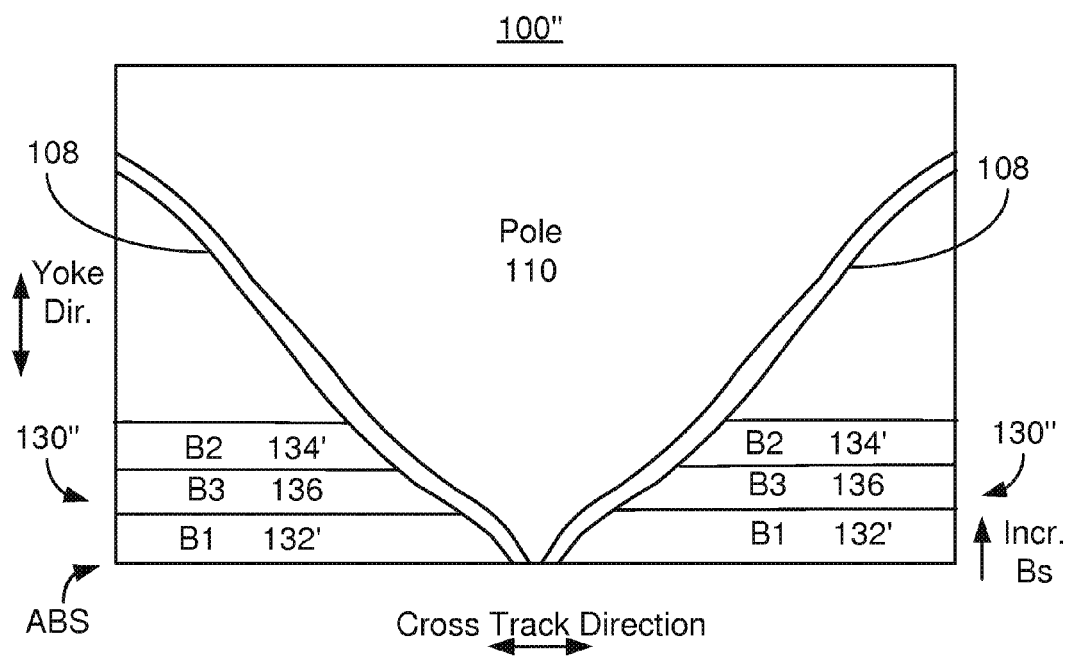
FIG. 4 is a plan view of another exemplary embodiment of a portion of a magnetic recording transducer with side shields having a gradient in saturation magnetization.

FIG. 4 depicts a plan view of another exemplary embodiment of the magnetic recording apparatus, or transducer 100". For clarity, FIG. 4 is not to scale. For simplicity not all portions of the transducer 100" are shown. In addition, although the transducer 100" is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100" is analogous to the transducer(s) 100 and 100', similar components have similar labels. Thus, the transducer 100" includes a side gap 108, main pole 110 and side shields 130" that are analogous to the side gap 108, the main pole 110 and the side shields 130/130', respectively.

The side shields 130" may be magnetically and, in some embodiments, physically connected with the trailing shield (not shown in FIG. 4) and leading shield (not shown in FIG. 4) of the underlayer (not shown in FIG. 4). In such embodiments, a full wraparound shield is formed. In other embodiments, the side shields 130" may be physically and/or magnetically disconnected from the trailing shield and/or the leading shield of the underlayer. The side shields 130" and side gap 108 are also depicted as symmetric in the cross track direction. In other embodiments, asymmetries in the cross track direction may be present.

The side shields 130" have a gradient in $B_s$ in the yoke direction. In the embodiment shown, this is achieved by including regions 132', 134' and 136 in the side shields 130". The regions 132' and 134' are analogous to the regions 132 and 134, respectively, shown in FIG. 3. Thus, the regions 132' and 134' have saturation magnetizations B1 and B2, respectively, such that B2>B1. The magnitudes of the saturation magnetizations of the saturation magnetizations of the regions 132' and 134' are analogous to those discussed above for regions 132 and 134. For example, B1 may be at least 1 T and not more than 2 T. In some such embodiments, the B1 for the region 132 is not more than 1.6 T. In other embodiments, B1 is at least 1 T and not more than 1.2 T. B2 is greater than 2 T and, in some embodiments is 2.3 T. In the embodiment shown, B1 and/or B2 may be constant throughout the regions 132' and 134', respectively. However, in other embodiments, the saturation magnetization may vary within the regions 132' and 134'.

The side shields 130" also include an intermediate region 136. The saturation magnetization of the region 136, B3, is greater than B1. Thus, the gradient in the saturation magnetization of the side shields 130" is such that the saturation magnetization increases in the yoke direction. In some embodiments, B3<B2. In such an embodiment, the saturation magnetization of the side shields 130" monotonically increases in the yoke direction. In an alternate embodiment, B3 may be greater than B2. In some embodiments, B3 does not vary in the region 136. In other embodiments, B3 may vary within the region 136. The interfaces between the regions 132 and 136 and between the regions 136 and 134 may be at some angle less than ninety degrees from the ABS. In the embodiment shown, theses interfaces are substantially parallel to the ABS.

Performance of the transducer 100" and disk drive may be improved by the side shields 130". Because the region 132' closest to the ABS has a lower saturation magnetization than the region 134', flux shunting may be reduced. However, the regions 136 and 134' of the side shields 130" have higher saturation magnetizations. Consequently, the gradient in the field from the pole may be improved. This increase may be particularly relevant for shingle recording. The increased saturation magnetization of portion(s) of the side shields recessed from the main pole may be less affected by the dynamic nature of switching of the main pole. In addition, the reduced saturation magnetization of the side shields at the ABS allow the sides shield to be less affected the return field from the media. Thus, WATER and other issues may be addressed and performance of the transducer 100" may be improved.

Figure 5:
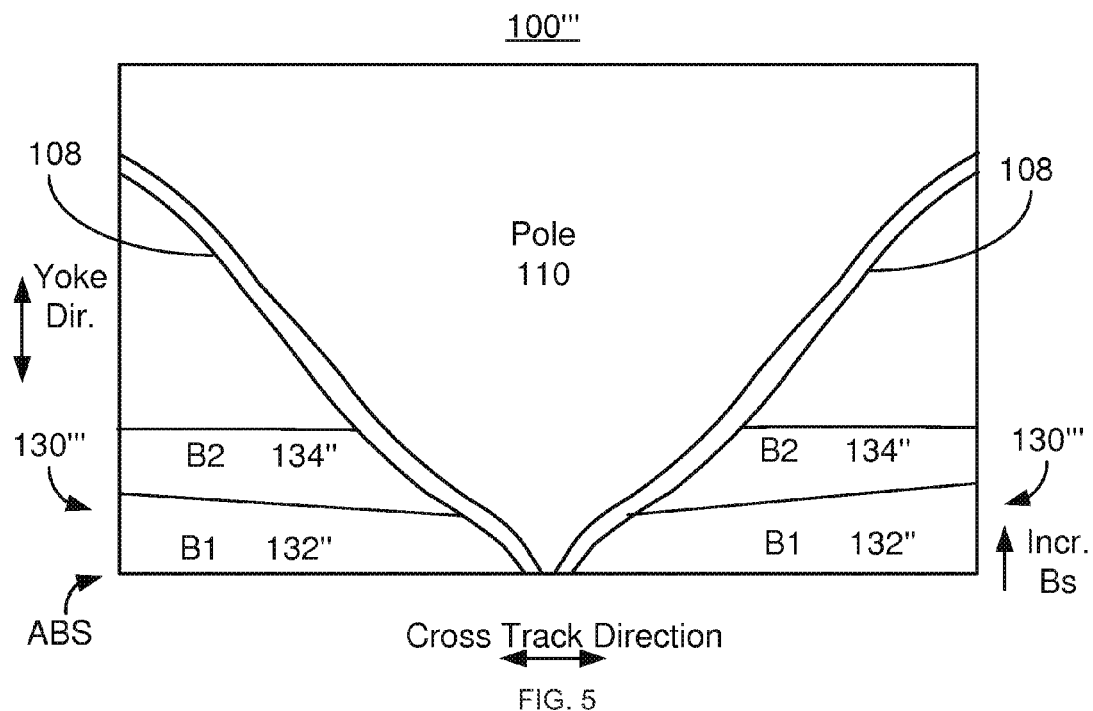
FIG. 5 is a plan view of another exemplary embodiment of a portion of a magnetic recording transducer with side shields having a gradient in saturation magnetization.

FIG. 5 depicts a plan view of another exemplary embodiment of the magnetic recording apparatus, or transducer 100'". For clarity, FIG. 5 is not to scale. For simplicity not all portions of the transducer 100'" are shown. In addition, although the transducer 100'" is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100'" is analogous to the transducer(s) 100, 100' and 100", similar components have similar labels. Thus, the transducer 100'" includes a side gap 108, main pole 110 and side shields 130'" that are analogous to the side gap 108, the main pole 110 and the side shields 130/130'/130", respectively.

The side shields 130'" may be magnetically and, in some embodiments, physically connected with the trailing shield (not shown in FIG. 5) and leading shield (not shown in FIG. 5) of the underlayer (not shown in FIG. 5). In such embodiments, a full wraparound shield is formed. In other embodiments, the side shields 130'" may be physically and/or magnetically disconnected from the trailing shield and/or the leading shield of the underlayer. The side shields 130'" and side gap 108 are also depicted as symmetric in the cross track direction. In other embodiments, asymmetries in the cross track direction may be present.

The side shields 130'" are essentially the same as the side shields 130'. The regions 132' and 134' have saturation magnetizations B1 and B2, respectively, such that B2>B1. However, the regions 132" and 134" are configured such that the interfaces between the regions 132" and 134" are not parallel to the ABS.

Performance of the transducer 100'" and disk drive may be improved by the side shields 130'". Because the region 132" closest to the ABS has a lower saturation magnetization than the region 134", flux shunting, field gradient, and WATER may be improved. Thus, performance of the transducer 100'" may be improved.

Figure 6:
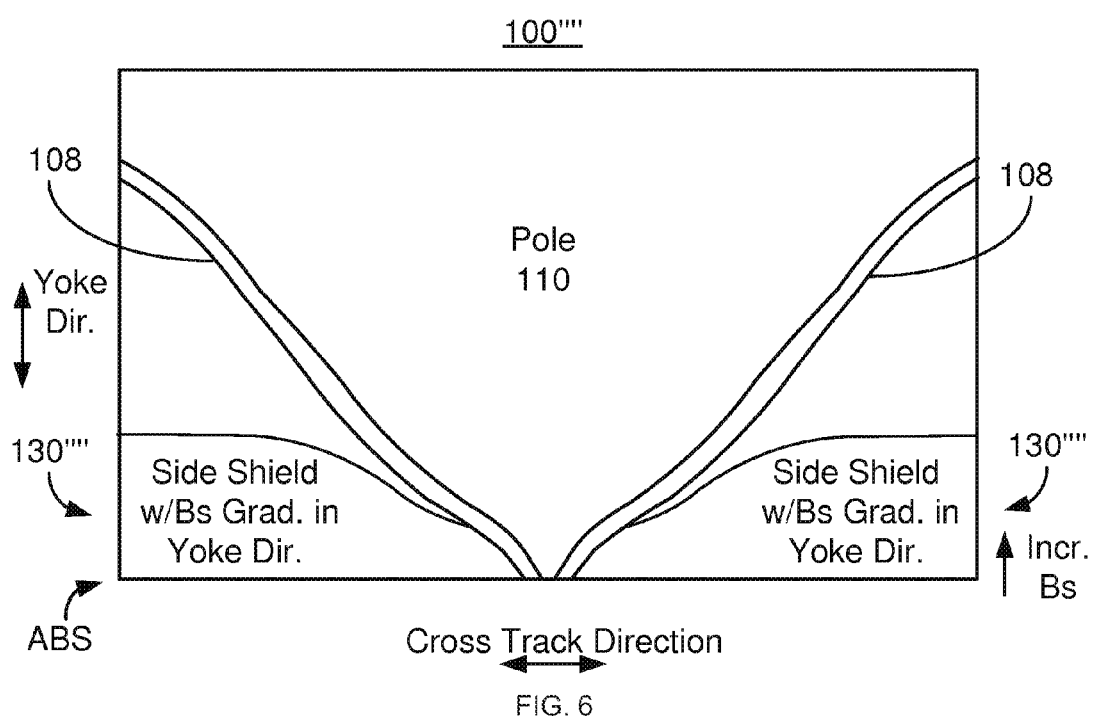
FIG. 6 is a plan view of another exemplary embodiment of a portion of a magnetic recording transducer with side shields having a gradient in saturation magnetization.

FIG. 6 depicts a plan view of another exemplary embodiment of the magnetic recording apparatus, or transducer 100"". For clarity, FIG. 6 is not to scale. For simplicity not all portions of the transducer 100"" are shown. In addition, although the transducer 100"" is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100"" is analogous to the transducer(s) 100, 100', 100" and 100'", similar components have similar labels. Thus, the transducer 100"" includes a side gap 108, main pole 110 and side shields 130"" that are analogous to the side gap 108, the main pole 110 and the side shields 130/130'/130"/130'", respectively.

The side shields 130"" may be magnetically and, in some embodiments, physically connected with the trailing shield (not shown in FIG. 6) and leading shield (not shown in FIG. 6) of the underlayer (not shown in FIG. 6). In such embodiments, a full wraparound shield is formed. In other embodiments, the side shields 130"" may be physically and/or magnetically disconnected from the trailing shield and/or the leading shield of the underlayer. The side shields 130"" and side gap 108 are also depicted as symmetric in the cross track direction. In other embodiments, asymmetries in the cross track direction may be present.

The saturation magnetization(s) of the side shields 130"" may be configured in the same manner as the side shields 130, 130', 130" and/or 130'". Thus, the sides shields 130"" have a gradient in the saturation magnetization such that the saturation magnetization increases in the yoke direction. However, as can be seen in FIG. 6, a portion of the side shields 130"" are not conformal with the pole 110. In the transducer 100"", a portion of the side shields 130"" recessed from the ABS nonconformal to the pole 110. Thus, the side gap between the pole 110 and the shields 130"" includes the side gap layer 108 and an additional region. In other embodiments, the portion of the side shields 130"" closer to the ABS may be nonconformal.

Performance of the transducer 100"" and disk drive may be improved by the side shields 130"". Because the saturation magnetization increases further from the ABS, flux shunting, field gradient, and WATER may be improved. Thus, performance of the transducer 100"" may be improved.

Figure 7:
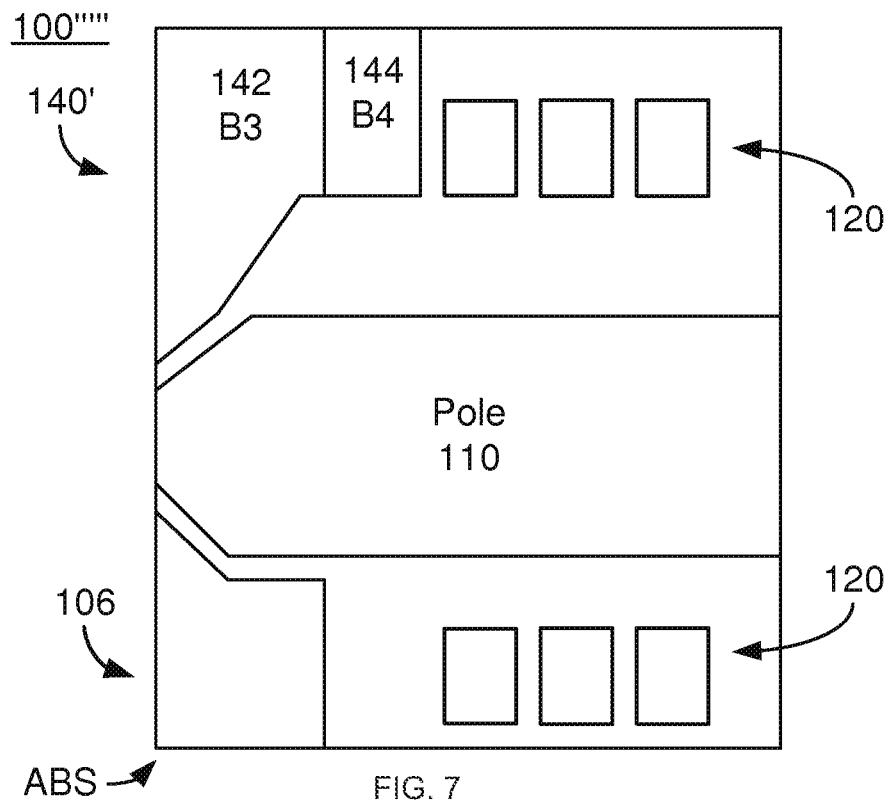
FIG. 7 is a side view of another exemplary embodiment of a portion of a magnetic recording transducer with a leading shield having a gradient in saturation magnetization.

FIG. 7 depicts a side view of another exemplary embodiment of the magnetic recording apparatus, or transducer 100""'. For clarity, FIG. 7 is not to scale. For simplicity not all portions of the transducer 100""' are shown. In addition, although the transducer 100""' is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100''''' is analogous to the transducer 100, 100', 100'', 100''' and/or 100'''', similar components have similar labels. Thus, the transducer 100''''' includes a side gap 108, main pole 110 and side shields (not shown in FIG. 7) that are analogous to the side gap 108, the main pole 110 and the side shields 130, respectively. The side shields for the transducer 100''''' may take the form of any of the side shields 130, 130', 130'', 130''' and/or 130''''. In other embodiments, the side shields for the transducer 100''''' may not have a gradient in the saturation magnetization. The side shields may be magnetically and, in some embodiments, physically connected with the trailing shield 140' and/or the leading shield 106. In such embodiments, a full wraparound shield is formed. In other embodiments, the side shields may be physically and/or magnetically disconnected from the trailing shield 140' and/or the leading shield 106.

The trailing shield 140' has a gradient in $B_s$ in the yoke direction. In the embodiment shown, this is achieved by including regions 142 and 144 in the trailing shield 140'. The first trailing shield region 142 occupies a portion of the ABS and is between the ABS and the second trailing shield region 144. In some embodiments, the saturation magnetization, B3, of the first region 142 at the ABS may be at least 1 T and less than 2.3 T. In some embodiments, the saturation magnetization of the region 142 matches that of the side shields and/or leading shield 106'. However, in other embodiment, the saturation magnetizations may differ. In the embodiment shown, the saturation magnetization for the region 142 is constant throughout the region. However, in other embodiments, the saturation magnetization may vary within the region 142. The region 142 may have a thickness in the yoke direction of at least twenty nanometers and not more than fifty nanometers. In some embodiments, the thickness of the region 142 in the yoke direction is at least twenty-five nanometers in thickness. In other embodiments, other thicknesses are possible. The thickness of the region 142 in the yoke direction may be sufficiently large that the region 142 is present after fabrication of the transducer, including lapping. Thus, as deposited, the region 142 is thicker than the tolerances for fabrication of the transducer 100'''''. In some such embodiments, the region 142 is desired to be sufficiently thick that at least one domain wall may be accommodated. Thus, the region 142 is thicker than a domain wall plus the fabrication tolerances. However, other thicknesses may be possible.

The saturation magnetization (B4) of the second region 144 is larger than the saturation magnetization of the first region 142. In other words B4>B3. For example, B4 may be greater than 2 T. In some embodiments, B4 is at least 2.3 T at the back surface of the trailing shield 140' furthest from the ABS. The interfaces between the regions 142 and 144 may be at some angle less than ninety degrees from the ABS. In the embodiment shown, theses interfaces are substantially parallel to the ABS. In other embodiments, other angles are possible. In some embodiments, B4 does not vary in the region 144. In other embodiments, B4 may vary within the region 144. The thickness of the region 144 may be at least fifty nanometers and not more than eighty nanometers. In other embodiments, other thicknesses are possible. Performance of the transducer 100''''' and disk drive may be improved by the trailing shield 140' for similar reasons as discussed above for the side shields.

Figure 8:
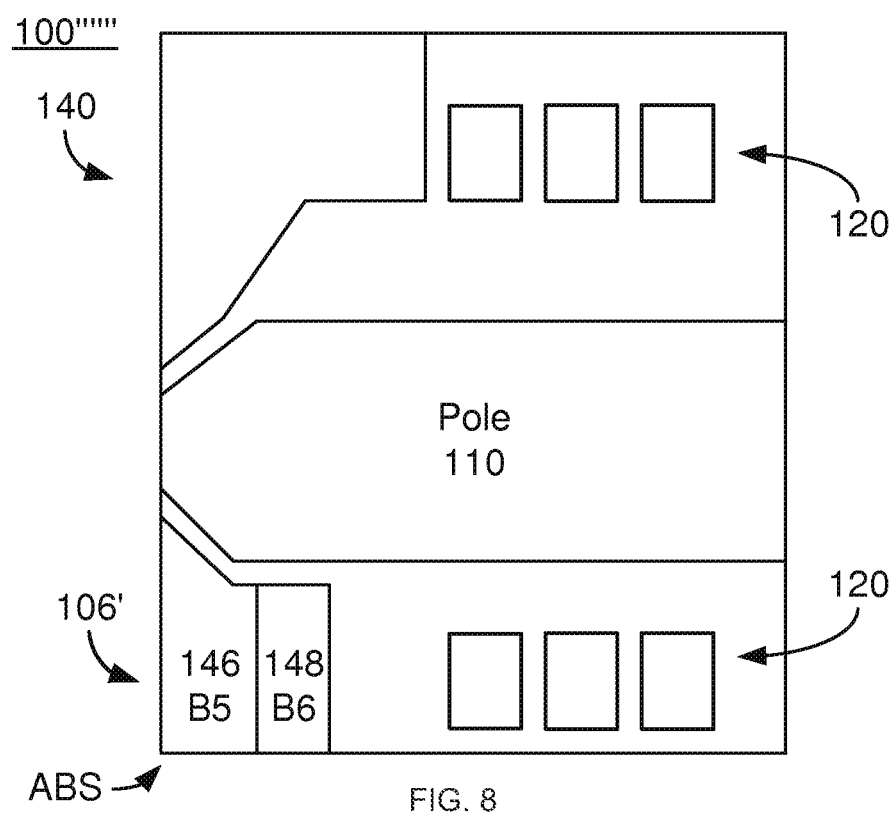
FIG. 8 is a side view of another exemplary embodiment of a portion of a magnetic recording transducer with a trailing shield having a gradient in saturation magnetization.

FIG. 8 depicts a side view of another exemplary embodiment of the magnetic recording apparatus, or transducer 100''''''. For clarity, FIG. 8 is not to scale. For simplicity not all portions of the transducer 100'''''' are shown. In addition, although the transducer 100'''''' is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100'''''' is analogous to the transducer 100, 100', 100'', 100''', 100'''' and/or 100''''', similar components have similar labels. Thus, the transducer 100'''''' includes a side gap 108, main pole 110 and side shields (not shown in FIG. 8) that are analogous to the side gap 108, the main pole 110 and the side shields 130, respectively. The side shields for the transducer 100'''''' may take the form of any of the side shields 130, 130', 130'', 130''' and/or 130''''. In other embodiments, the side shields for the transducer 100'''''' may not have a gradient in the saturation magnetization. The side shields may be magnetically and, in some embodiments, physically connected with the trailing shield 140 and/or the leading shield 106'. In such embodiments, a full wraparound shield is formed. In other embodiments, the side shields may be physically and/or magnetically disconnected from the trailing shield 140 and/or the leading shield 106'.

The leading shield 106' has a gradient in $B_s$ in the yoke direction. In the embodiment shown, this is achieved by including regions 146 and 148 in the leading shield 106'. The first leading shield region 146 occupies a portion of the ABS and is between the ABS and the second leading shield region 148. In some embodiments, the saturation magnetization, B5, of the first region 146 at the ABS may be at least 1 T and not more than 2 T. In some embodiments, the saturation magnetization of the region 106' matches that of the side shields and/or trailing shield 140. However, in other embodiment, the saturation magnetizations may differ. In the embodiment shown, the saturation magnetization for the region 146 is constant throughout the region. However, in other embodiments, the saturation magnetization may vary within the region 146. The region 146 may have a thickness in the yoke direction of at least twenty nanometers and not more than fifty nanometers. In some embodiments, the thickness of the region 146 in the yoke direction is at least twenty-five nanometers in thickness. In other embodiments, other thicknesses are possible. The thickness of the region 146 in the yoke direction may be sufficiently large that the region 146 is present after fabrication of the transducer, including lapping. Thus, as deposited, the region 146 is thicker than the tolerances for fabrication of the transducer 100. In some such embodiments, the region 146 is desired to be sufficiently thick that at least one domain wall may be accommodated. Thus, the region 16 is thicker than a domain wall plus the fabrication tolerances. However, other thicknesses may be possible.

The saturation magnetization (B6) of the second region 18 is larger than the saturation magnetization of the first region 146. In other words B6>B5. For example, B6 may be greater than 2 T. In some embodiments, B6 is at least 2.3 T at the back surface of leading shield 106' furthest from the ABS. The interfaces between the regions 146 and 148 may be at some angle less than ninety degrees from the ABS. In the embodiment shown, theses interfaces are substantially parallel to the ABS. In other embodiments, other angles are possible. In some embodiments, B6 does not vary in the region 148. In other embodiments, B6 may vary within the region 148. The thickness of the region 146 may be at least fifty nanometers and not more than eighty nanometers. In other embodiments, other thicknesses are possible. Performance of the transducer 100''''''' and disk drive may be improved by the leading shield 106'.

Figure 9:
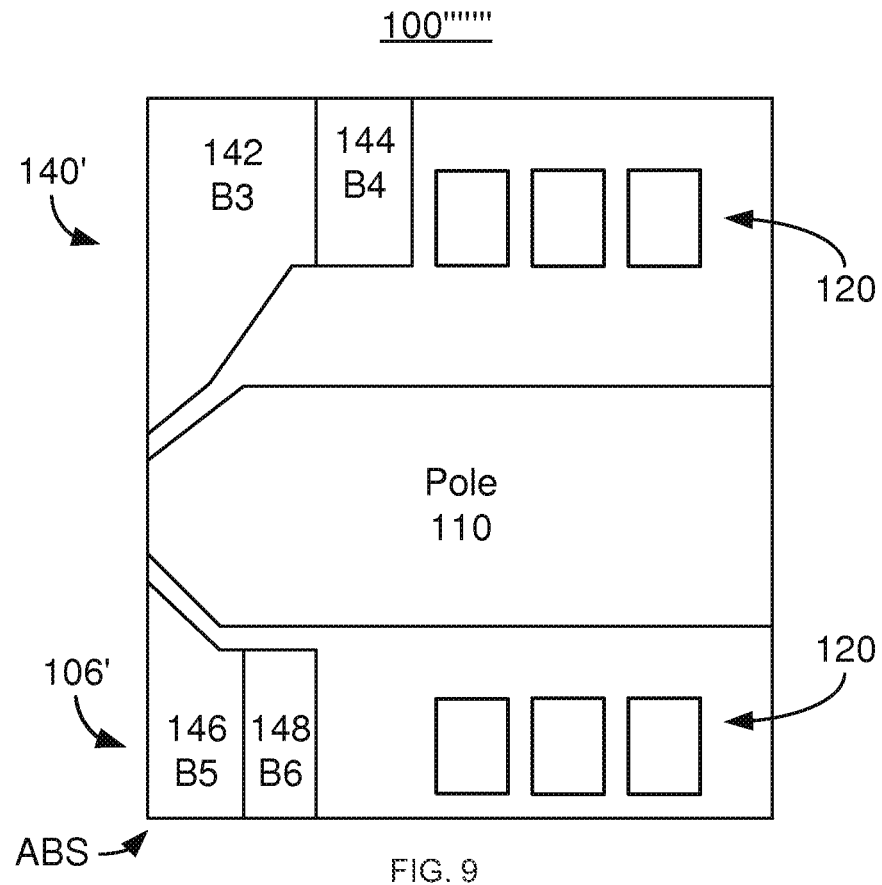
FIG. 9 is a side view of another exemplary embodiment of a portion of a magnetic recording transducer with leading and trailing shields having a gradient in saturation magnetization.

FIG. 9 depicts a side view of another exemplary embodiment of the magnetic recording apparatus, or transducer 100'''''''. For clarity, FIG. 9 is not to scale. For simplicity not all portions of the transducer 100''''''' are shown. In addition, although the transducer 100''''''' is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100''''''' is analogous to the transducer 100, 100', 100'', 100''', 100'''', 100''''' and/or 100'''''', similar components have similar labels. Thus, the transducer 100''''''' includes a side gap 108, main pole 110 and side shields (not shown in FIG. 9) that are analogous to the side gap 108, the main pole 110 and the side shields 130, respectively. The side shields for the transducer 100 may take the form of any of the side shields 130, 130', 130'', 130''' and/or 130''''. In other embodiments, the side shields for the transducer 100''''''' may not have a gradient in the saturation magnetization. The side shields may be magnetically and, in some embodiments, physically connected with the trailing shield 140' and/or the leading shield 106'. In such embodiments, a full wraparound shield is formed. In other embodiments, the side shields may be physically and/or magnetically disconnected from the trailing shield 140 and/or the leading shield 106''.

In the embodiment shown in FIG. 9, both the leading shield 106' and the trailing shield 140' have a gradient in $B_s$ in the yoke direction. In the embodiment shown, this is achieved by including regions 146 and 148 in the leading shield 106' and regions 142 and 144 in the trailing shield 140'. These regions may be configured in an analogous manner to the regions 142, 144, 146 and 148 depicted in FIGS. 7 and 8. Performance of the transducer 100''''''' and disk drive may be improved by the leading shield 106' and the trailing shield 140'.

Figure 10:
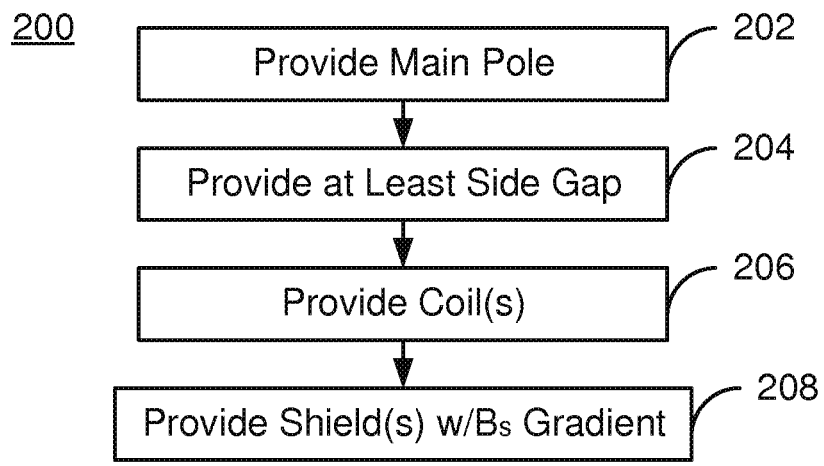
FIG. 10 depicts a flow chart of an exemplary embodiment of a method for providing a magnetic recording transducer having a gradient in side shield saturation magnetization.

FIG. 10 depicts an exemplary embodiment of a method 200 for providing a magnetic recording transducer or analogous data storage device. For simplicity, some steps may be omitted, interleaved, performed in another order and/or combined. The method 200 may be used to fabricate multiple magnetic recording heads at substantially the same time. The method 200 is described in the context of the magnetic transducer 100. The method 200 may also be used to fabricate other magnetic recording transducers including but not limited to the transducers 100', 100'', 100''', 100'''', 100''''', 100'''''' and/or 100'''''''. The method 200 is also described in the context of particular layers. A particular layer may include multiple materials and/or multiple sub-layers. The method 200 also may start after formation of other portions of the magnetic recording transducer. For example, the method 200 may start after the underlayer, optionally including a leading shield, has been formed.

The main pole 110 is formed, via step 202. In some embodiments, step 202 includes forming a trench in one or more nonmagnetic layers. For example, one or more reactive ion etches (RIEs) may form the trench. The trench has a shape and location that corresponds to the pole. In other embodiments the trench may be provided in the side shields. Magnetic material(s) for the pole are deposited. The transducer may then be planarized. A trailing edge bevel may optionally be formed on the trailing surface (top) of the main pole.

The side gap 108 is provided, via step 204. Step 204 may include depositing a Ru layer, for example via chemical vapor deposition, sputtering or another method. Additional layer(s) may also be provided. In some embodiments, step 204 is performed before step 202. Thus, the main pole 110 is provided on the side gap 108 in such embodiments.

The coil(s) 120 for the main pole are provided, via step 206. Step 206 may be interleaved with other steps of the method 200. For example, portions of the coil(s) 120 may be formed before the main pole 110 and side shields 130. The coil(s) formed may be helical coil(s) or spiral coils.

At least one of the leading shields 106/106', the trailing shield 140/140' and/or the side shields 130/130'/130''/130'''/130'''' are provided, via step 208. Step 208 includes forming portions of the leading shield, side shields, and/or trailing shield such that the saturation magnetization increases the yoke direction. For example, plating of the leading shield 106, side shield(s) 130 and/or trialing shield 140 may commence at the ABS and proceed in the yoke direction (or vice versa). In such an embodiment, the stoichiometry of the shield(s) 106, 130 and/or 140 changes during plating. In another embodiment, portions of the shield regions may be covered by a mask, while other portion(s) are exposed for plating of the shield material. After the stripe is deposited, the mask may be removed. The masking and deposition steps may be repeated with different materials and/or materials with different stoichiometries provided in each deposition step. In such an embodiment, each deposition may provide a region having a particular saturation magnetization. The deposition steps are performed such that the saturation magnetization increases in the yoke direction. When multiple shields possess the gradient in saturation magnetization described herein, these steps may be repeated multiple times for some or all of the shields. For example, the leading shield, trailing shield and side shields may be formed separately. In other embodiments, the leading and side shields may be formed together. In such an embodiment, the pole 110 may be formed in a trench in the shield material. In other embodiments, the side shields 130 and trailing shield 140 may be deposited together. In other embodiments, step 208 may be performed in another manner. Fabrication of the magnetic transducer may then be completed.

Using the method 200, a magnetic transducer having improved performance may be fabricated. Because of the gradient in the saturation magnetization of the side shields /130'/130''/130'''/13041'', leading shield 106/106' and/or trailing shield 140/140 may be fabricated and the benefits thereof achieved.

Figure 11:
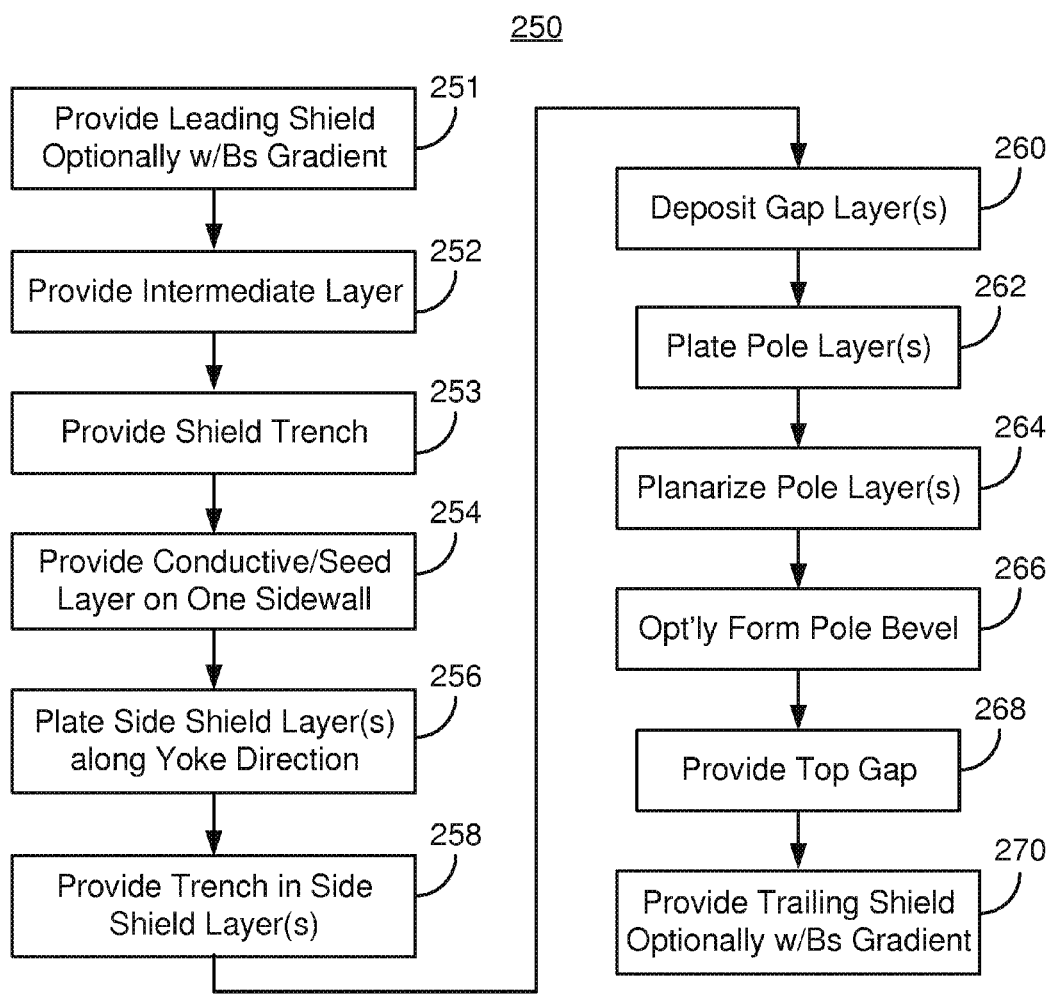
FIG. 11 depicts a flow chart of an exemplary embodiment of a method for providing a magnetic recording transducer having a gradient in side shield saturation magnetization.

FIG. 11 depicts an exemplary embodiment of a method 250 for providing a magnetic transducer having side shields that have a gradient in saturation magnetization such that the saturation magnetization increases in the yoke direction. For simplicity, some steps may be omitted, interleaved, performed in another order and/or combined. The method 250 is also described in the context of providing a magnetic recording transducer 150 depicted in FIGS. 12-19 depict ABS views of an exemplary embodiment of a transducer 150 during fabrication using the method 250. The method 250 may be used to fabricate multiple magnetic recording heads at substantially the same time. The method 250 may also be used to fabricate other magnetic recording transducers. The method 250 is also described in the context of particular layers. A particular layer may include multiple materials and/or multiple sub-layers. The method 250 also may start after formation of other portions of the magnetic recording transducer.

For example, the method 250 may start after a read transducer, return pole/shield and/or other structure have been fabricated.

A leading shield is provided, via step 251. In some embodiments, the leading shield fabricated in step 251 may have a gradient in the saturation magnetization such that $B_s$ increases in the yoke direction. In other embodiments, the saturation magnetization for the leading shield may be substantially constant. Step 251 may be performed in a similar manner to steps 254-256, described below. In other embodiments, step 251 may be performed in another manner. A nonmagnetic intermediate layer is provided on the leading shield, via step 252.

Figure 12:
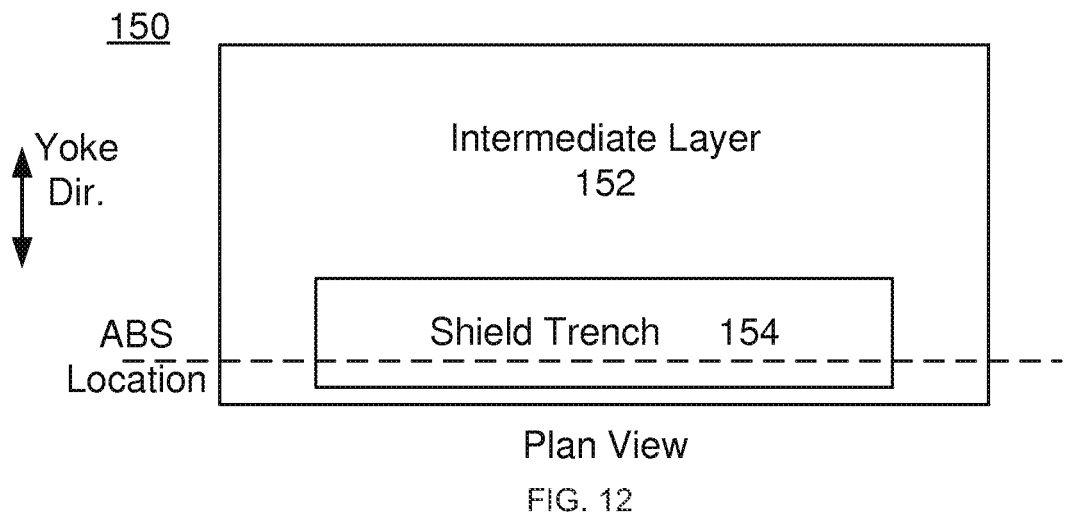
FIGS. 12-19 depict another exemplary embodiment of a portion of a magnetic recording transducer with side shields having a gradient in saturation magnetization during fabrication.

A shield trench in a nonmagnetic intermediate layer is provided, via step 253. Step 253 may be completed by providing a mask having an aperture with the shape and location of the shield region. The intermediate layer may then be removed, for example via an RIE that is appropriate for the material(s) in the intermediate layer. FIG. 12 depicts the transducer 150 after step 253 is performed. Thus, an intermediate layer 152 having a trench 154 therein is shown. In some embodiments, the trench 154 extends through the intermediate layer 152 to another layer below. In other embodiments, the bottom of the trench 154 is in the intermediate layer.

A seed layer is provided, via step 254. In some embodiments, the seed layer is a material such as NiP. The seed layer may be plated in step 254. In some embodiments, in which plating is desired to be towards or away from the ABS, the seed layer is desired to be only on the wall of the trench 154. For example, the seed layer may be on the trench wall closest to the bottom of FIG. 12 or the trench wall closest to the top of FIG. 12. In such embodiments, portions of the seed layer may be masked. Exposed portions of the seed layer may then be removed. In other embodiments, a mask may be provided prior to growth or deposition of the seed layer. The seed layer would be provided on the exposed portion of the trench and the mask removed.

Figure 13A:
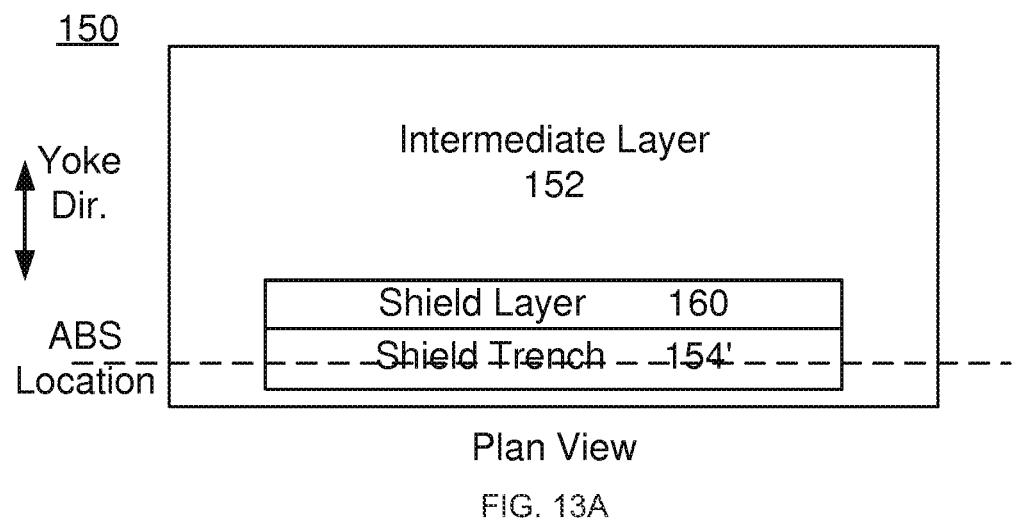
Figure 13B:
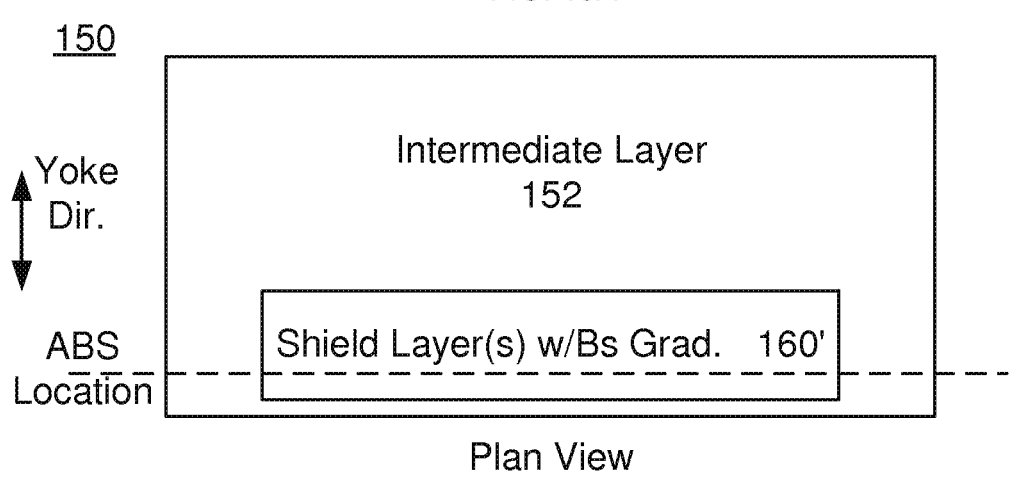

The side shield material(s) are plated along the yoke direction, via step 256. In step 256, the side shield materials may start growing from locations recessed from the ABS and grow toward the ABS. Alternatively, side shield materials may grow from regions that will be lapped away, toward the ABS and end in the region recessed from the ABS. FIG. 13A depicts the transducer 150 during step 256. In the embodiment shown, the side shield material(s) 160 start growing from the back wall of the trench 154 that is recessed from the ABS. Thus, the remaining portion of the trench 154' includes the ABS. The growth of the side shield material(s) continues until the trench 154' is filled. FIG. 13B depicts the transducer 150 after step 256 has been completed. Thus, the trench has been filled with the side shield material(s) 160'. The plating, or other deposition/growth method used in step 256, is configured such that there is a gradient in the saturation magnetization of the shield layer(s) 160' in the yoke direction. Thus, the materials for side shields analogous to the shields 130, 130', 130'', 130''' and/or 130'''' may be formed. Note that in some embodiments, masks may be used to cover portions of the side shield trench in step 256. In such embodiments, the materials may be grown from the bottom of the trench or from the sidewalls.

Figure 14A:
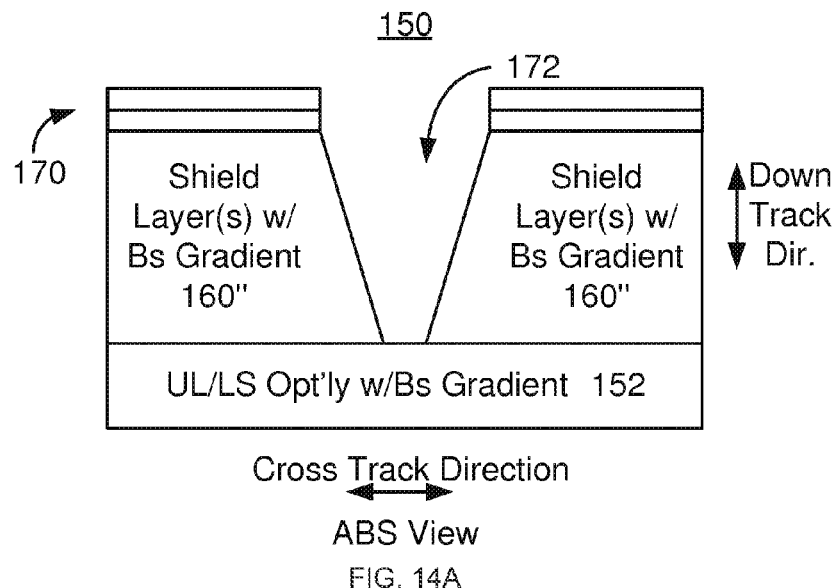
Figure 14B:
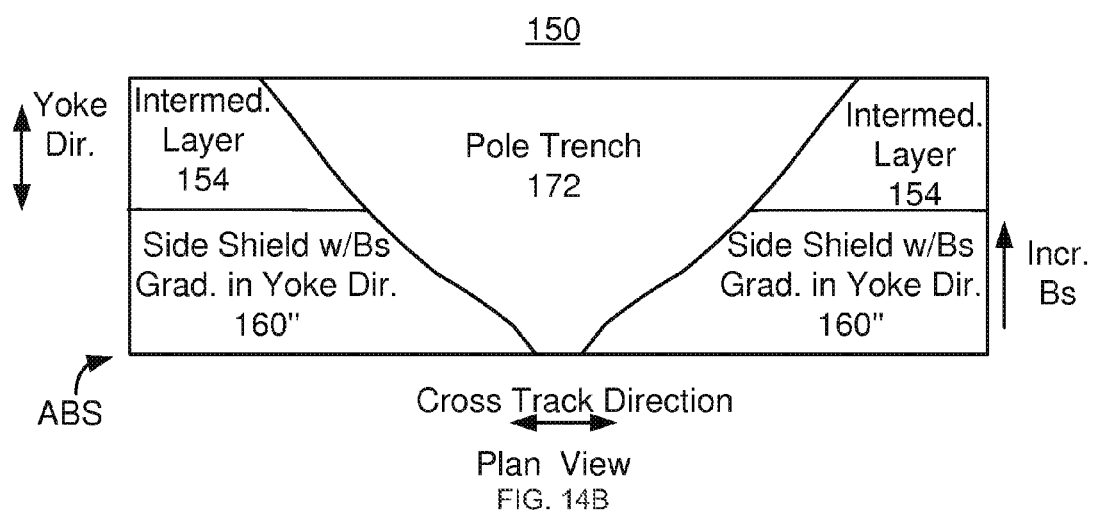

A trench for the main pole is provided in the side shield material(s), via step 258. Step 258 may include forming a hard mask on the side shield material(s). The hard mask may have an aperture having a shape and location corresponding to the portion of the main pole that is between the side shields. The portion of the side shield material(s) exposed by the aperture are removed, for example via RIE(s). FIGS. 14A and 14B depict ABS and plan views of the transducer 150 after step 258 is performed. Thus, the mask 170 and pole trench 172 have been formed. Note that the pole trench 172 may also extend into the intermediate layer 154 that resides further from the ABS location than the side shields 160''. Also shown is the underlayer/leading shield 152, which may have a gradient in saturation magnetization. In other embodiments, the leading shield may be omitted. In such embodiments, the layer 152 may be a nonmagnetic underlayer.

Figure 15A:
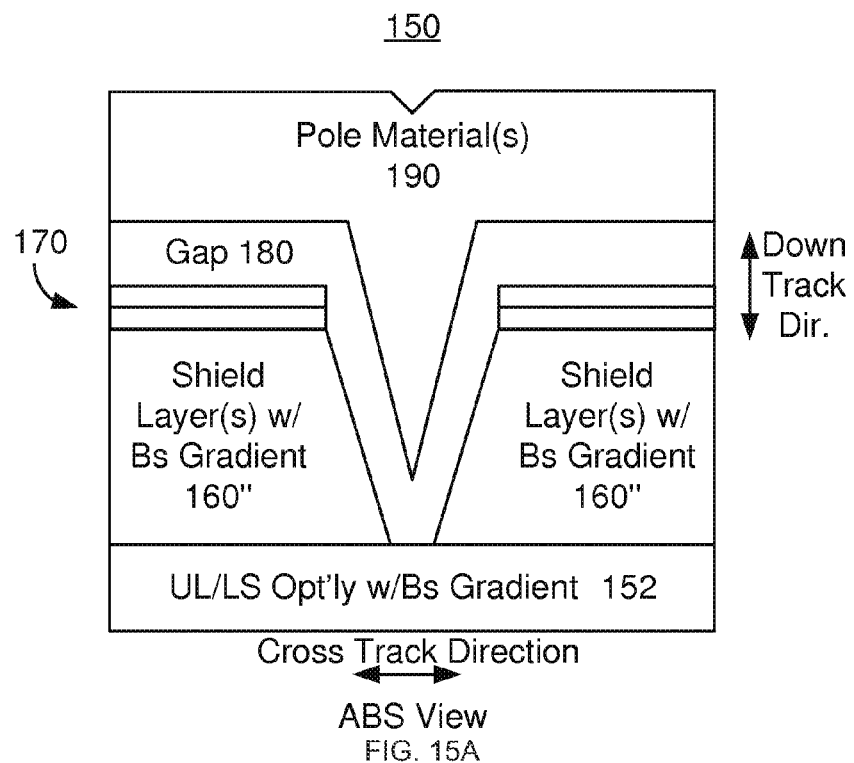
Figure 15B:
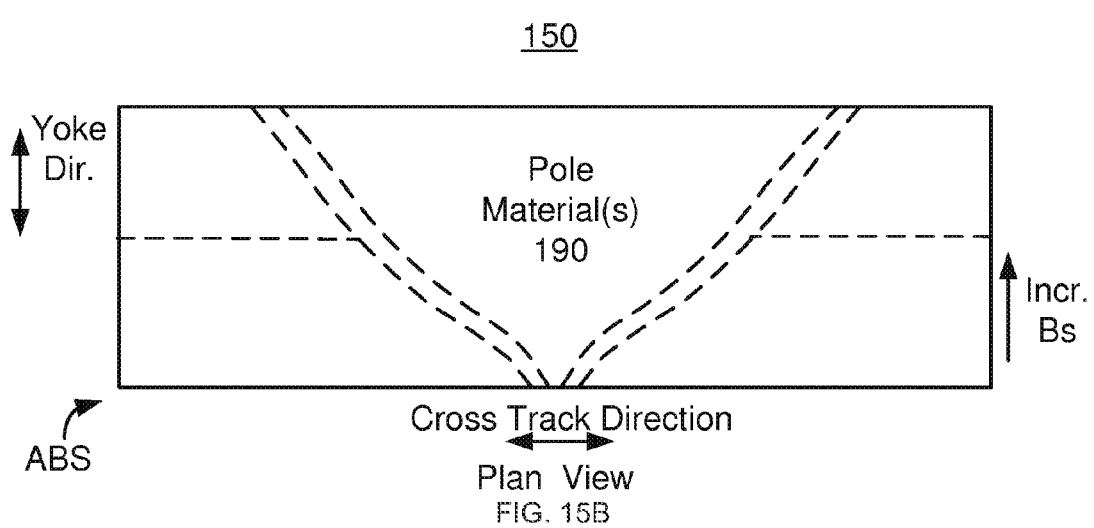

One or more gap layers are provided, via step 260. Step 260 may include depositing a layer such as Ru. In some embodiments, a multilayer gap is provided in step 260. The material(s) of the pole are then plated, via step 262. FIGS. 15A and 15B depict ABS and plan views of the transducer 150 after step 262 is performed. Thus, the gap 180 and pole material(s) 190 are shown.

Figure 16A:
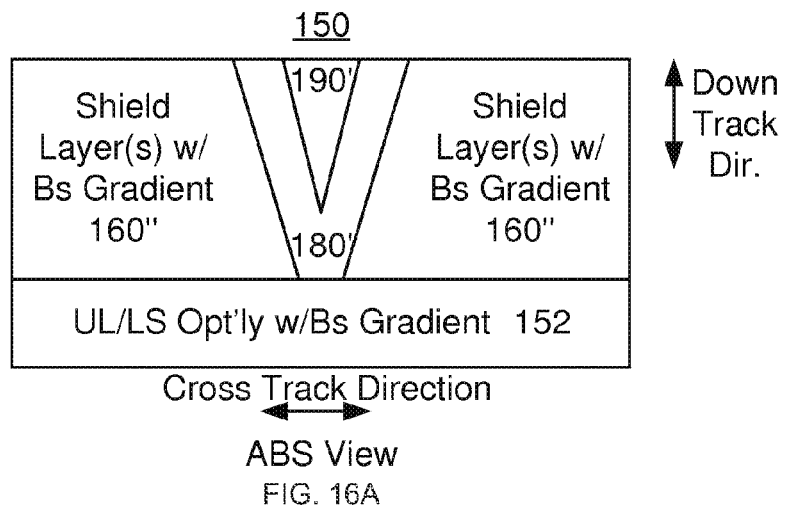
Figure 16B:
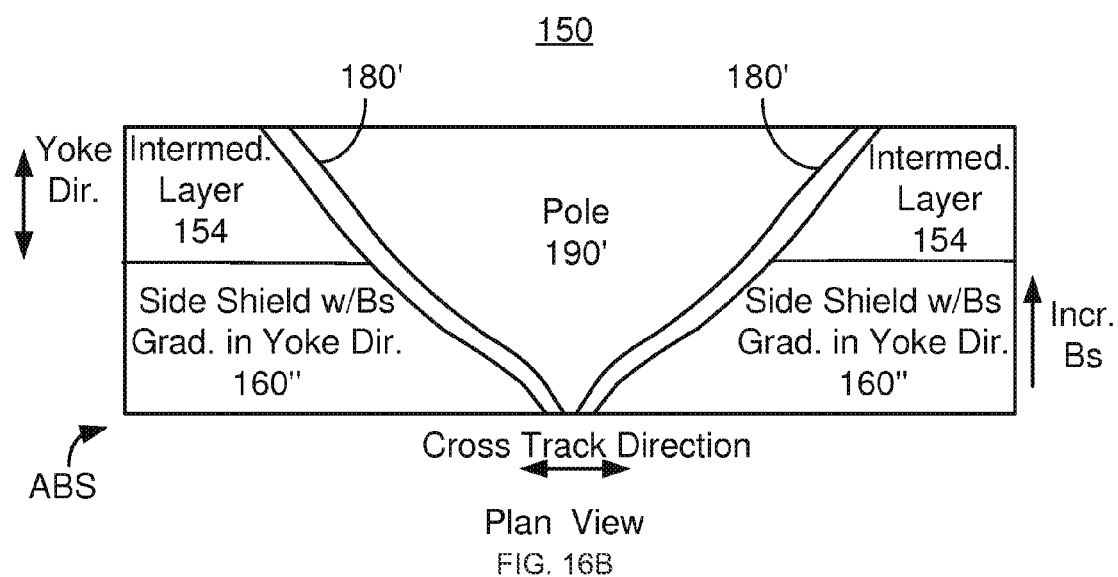

A planarization is performed for at least the pole material(s) 190, via step 264. The mask may also be removed in step 264. The trailing bevel may optionally be formed in the main pole, via step 266. FIGS. 16A and 16B depict ABS and plan views of the transducer after step 264 and, optionally, 266 have been performed. Thus, the pole 190' has been formed. The side gap 180' is between the side shields 160'' and the main pole 190'.

Figure 17:
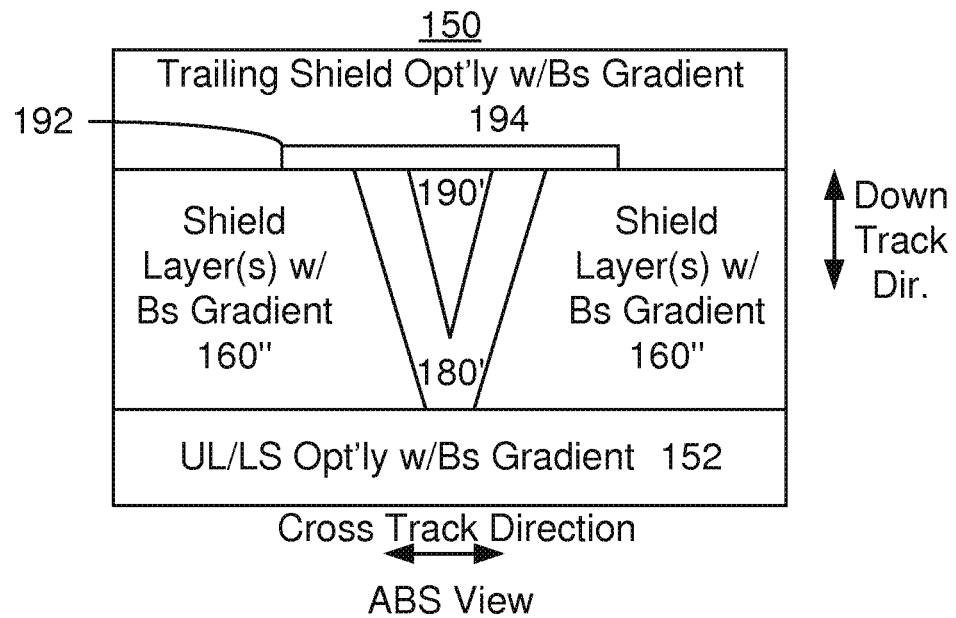
Figure 18:
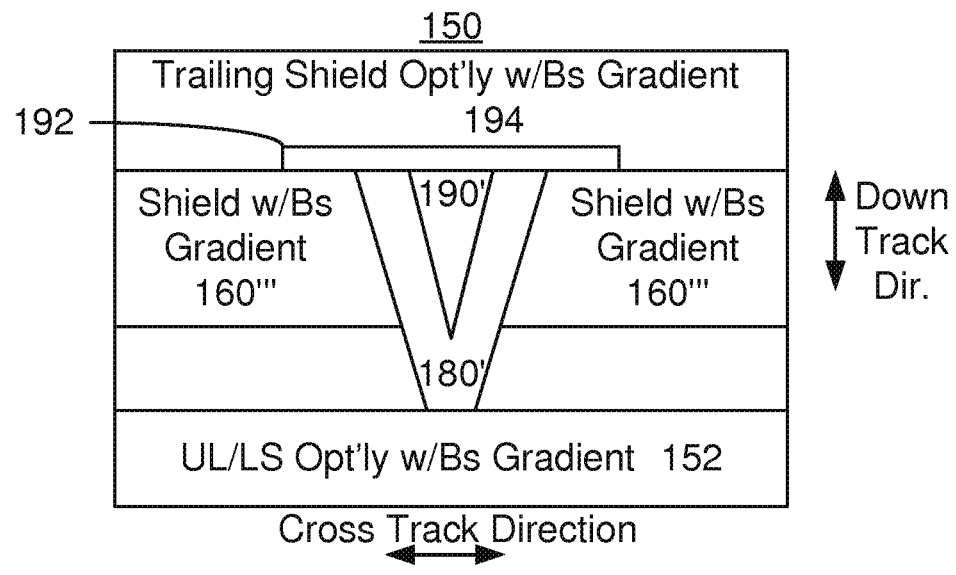
Figure 19:
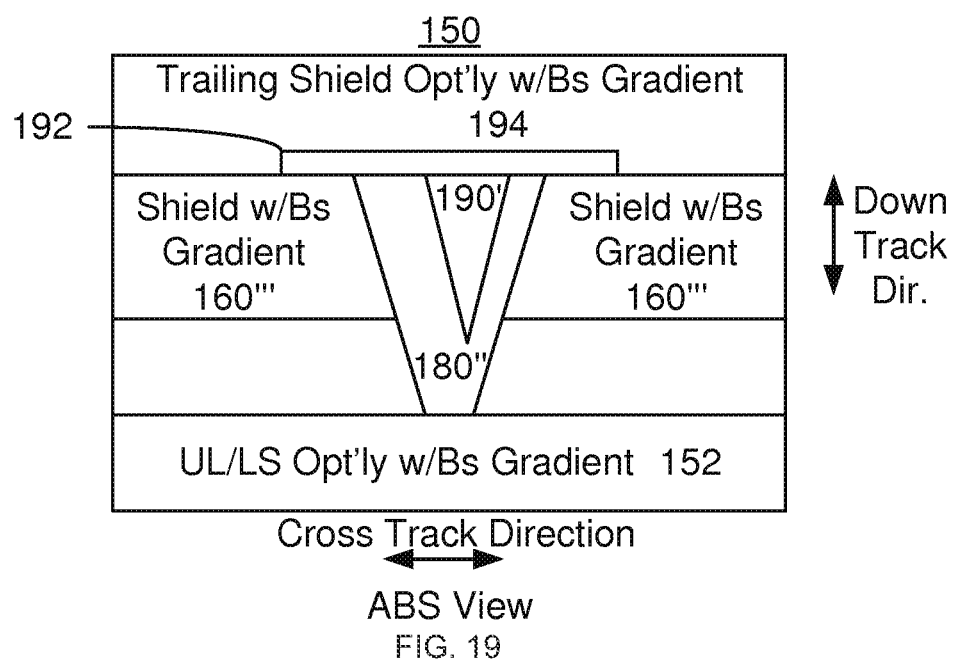

A top, or write gap layer may also be provided, via step 268. The trailing shield may be formed, via step 270. In some embodiments, the trailing shield fabricated in step 270 may have a gradient in the saturation magnetization such that $B_s$ increases in the yoke direction. In other embodiments, the saturation magnetization for the leading shield may be substantially constant. Step 270 may be performed in a similar manner to steps 254-256, described above. In other embodiments, step 270 may be performed in another manner. FIGS. 17, 18 and 19 depict ABS views of different versions of the transducer 150 after step 270 has been performed. Thus, a top gap 192 and trailing shield 194 have been formed. The trailing shield 194 may have a gradient in saturation magnetization. In the embodiment shown in FIG. 17, the side shields 160'' extend to the underlayer/leading shield 152. Thus, a full wraparound shield may be formed. In the embodiment depicted in FIG. 18, the side shields 160''' still have a gradient in saturation magnetization in the yoke direction. However, the side shields 160''' do not extend below the bottom of the main pole 190'. Thus, the side shields 160''' may be termed half side shields. Although the side shields 160''' are shown as extending the same distance in the down track direction, in some embodiments, the side shield 160''' on one side may extend further than on the other. In some embodiments, one of the side shields 160''' may be omitted or extend only a short distance from the top of the main pole. Further, a leading shield 152 or a nonmagnetic underlayer 152 may be used. In addition, although the side gap 180' is shown in FIGS. 15A-18 as being symmetric, in other embodiments, the gap 180' may be asymmetric. For example, FIG. 19 depicts a transducer 150'' in which the side gap 180' is thicker on one side of the main pole than on the other.

Using the method 250, the transducer 150 including leading shield 152, side shield(s) 160'' and/or 160''' and/or including trailing shield 194 may be provided. Because the saturation magnetization increases further from the ABS, flux shunting, field gradient, and WATER may be improved. Thus, performance of the transducer 150 may be improved.

We claim:

1. A magnetic transducer having air-bearing surface (ABS) comprising:
 a main pole, a portion of the main pole residing at the ABS;
 a side gap;

at least one coil configured to energize the main pole; and
at least one of a leading shield, a trailing shield and at least one side shield, the side gap being between the main pole and the at least one side shield, the main pole being between the leading shield and the trailing shield, the at least one of the leading shield, the trailing shield and the at least one side shield having a gradient in a saturation magnetization ($B_s$) such that the saturation magnetization increases in a yoke direction, the yoke direction being perpendicular to the ABS.

2. The magnetic recording transducer of claim 1 wherein the at least one of the leading shield, the trailing shield and the at least one side shield has a first portion and a second portion, the first portion being between the second portion and the ABS, the first portion having a first saturation magnetization, the second portion having a second saturation magnetization, the first magnetization being less than the second saturation magnetization such that the gradient in the saturation magnetization includes a difference between the first magnetization and the second magnetization.

3. The magnetic recording transducer of claim 2 wherein the at least one of the leading shield, the trailing shield and the at least one side shield includes a third portion between the first portion and the second portion, the third portion having a third saturation magnetization greater than the first saturation magnetization and less than the second saturation magnetization.

4. The magnetic recording transducer of claim 2 wherein at least one of the leading shield and the at least one side shield has the gradient in the saturation magnetization and wherein the first saturation magnetization is at least 1.0 T and not more than 2.0 T and wherein the second saturation magnetization greater than 2.0 T.

5. The magnetic recording transducer of claim 4 wherein the first portion has a first thickness in the yoke direction of at least twenty nanometers and not more than fifty nanometers.

6. The magnetic recording transducer of claim 5 wherein the first thickness is at least twenty-five nanometers.

7. The magnetic recording transducer of claim 2 wherein the first saturation magnetization is constant.

8. The magnetic recording transducer of claim 1 wherein the gradient in the saturation magnetization is configured such that the saturation magnetization increases monotonically in the yoke direction.

9. The magnetic recording transducer of claim 8 wherein the gradient in the saturation magnetization increases stepwise.

10. The magnetic recording transducer of claim 8 wherein the gradient in the saturation magnetization increases linearly.

11. The magnetic recording transducer of claim 1 wherein the transducer includes the leading shield, the at least one side shield and the trailing shield, and wherein the leading shield, the trailing shield and the at least one side shield forming a full wraparound shield.

12. The magnetic recording transducer of claim 1 wherein the main pole includes a bottom and a top, wherein the transducer includes the leading shield, the at least one side shield and the trailing shield, and wherein the trailing shield is opposite to the top of the main pole and magnetically coupled with the at least one side shield, the at least one side shield extending from the trailing shield to a location between the trailing shield and the bottom of the main pole.

13. A data storage device comprising:
a media;
a slider including a magnetic recording transducer having an air-bearing surface (ABS), a main pole, a side gap, at least one coil configured to energize the main pole and at least one of a leading shield, a trailing shield and at least one side shield, a portion of the main pole residing at the ABS, the side gap being between the main pole and the at least one side shield, the main pole being between the leading shield and the trailing shield, the at least one of the leading shield, the trailing shield and the at least one side shield having a gradient in a saturation magnetization ($B_s$) such that the saturation magnetization increases in a yoke direction, the yoke direction being perpendicular to the ABS.

14. A method for providing a magnetic transducer having air-bearing surface (ABS) comprising:
providing a main pole, a portion of the main pole residing at the ABS;
providing a side gap;
providing at least one coil for energizing the main pole; and
providing at least one of a leading shield, a trailing shield and at least one side shield, the side gap being between the main pole and the at least one side shield, the main pole being between the leading shield and the trailing shield, the at least one of the leading shield, the trailing shield and the at least one side shield having a gradient in a saturation magnetization ($B_s$) such that the saturation magnetization increases in a yoke direction, the yoke direction being perpendicular to the ABS.

15. The method of claim 14 wherein the at least one of the leading shield, the trailing shield and the at least one side shield has a first portion and a second portion, the first portion being between the second portion and the ABS, the first portion having a first saturation magnetization, the second portion having a second magnetization, the first magnetization being less than the second magnetization such that the gradient in the saturation magnetization includes a difference between the first magnetization and the second magnetization.

16. The method of claim 15 wherein at least one of the leading shield and the at least one side shield has the gradient in the saturation magnetization and wherein the first saturation magnetization is at least 1.0 T and not more than 2.0 T and wherein the second saturation magnetization is greater than 2.0 T.

17. The method of claim 16 wherein the first portion has a first thickness in the yoke direction of at least twenty nanometers and not more than fifty nanometers.

18. The method of claim 14 wherein the gradient in the saturation magnetization is configured such that the saturation magnetization increases monotonically in the yoke direction.

19. The method of claim 14 wherein the step of providing the at least one of the leading shield, the trailing shield and the at least one side shield further includes:
providing the leading shield;
providing the trailing shield; and
providing the at least one side shield to form a full wraparound shield.

20. The method of claim 14 wherein the main pole includes a bottom and a top, the step of providing the at least one of the leading shield, the trailing shield and the at least one side shield further includes:
providing the leading shield opposite to the bottom of the main pole;
providing the at least one side shield; and
providing the trailing shield opposite to the top of the main pole, the leading shield, the trailing shield and the at least one side shield forming a full wraparound shield, the at least one side shield extending from the trailing shield to a location between the trailing shield and the bottom of the main pole.

21. The method of claim 14 wherein the step of providing the at least one of the leading shield, the trailing shield and the at least one side shield forms the at least one side shield and further includes:
   plating the at least one side shield in the yoke direction.

22. The method of claim 21 wherein the step of plating the at least one side shield further includes:
   forming a trench corresponding to the at least one side shield in a nonmagnetic layer, the trench having a plurality of sidewalls and a back wall distal from the ABS;
   providing a conductive layer on the back wall; and
   plating at least one side shield layer.

23. The method of claim 22 wherein the step of providing the side gap further includes:
   removing a portion of the at least one side shield layer to form a pole trench therein; and
   depositing the side gap in the pole trench.

24. The method of claim 23 wherein the step of providing the main pole further includes:
   providing the main pole on the side gap.

* * * * *